United States Patent
Eriksson

(10) Patent No.: US 7,233,278 B2
(45) Date of Patent: Jun. 19, 2007

(54) RADAR LEVEL GAUGE WITH SWITCH FOR SELECTING TRANSMITTER OR RECEIVER MODE

(75) Inventor: Mikael Eriksson, Linköping (SE)

(73) Assignee: Rosemount Tank Radar AB, Gothenburg (SE)

( * ) Notice: Subject to any disclaimer, the term of this patent is extended or adjusted under 35 U.S.C. 154(b) by 348 days.

(21) Appl. No.: 10/938,128

(22) Filed: Sep. 10, 2004

(65) Prior Publication Data
US 2006/0055591 A1    Mar. 16, 2006

(51) Int. Cl.
*G01S 13/08*    (2006.01)
(52) U.S. Cl. ..................................... 342/124
(58) Field of Classification Search ................. 342/124
See application file for complete search history.

(56) References Cited

U.S. PATENT DOCUMENTS

| | | | |
|---|---|---|---|
| 4,739,330 A | 4/1988 | Lazarus | 342/122 |
| 5,345,471 A | 9/1994 | McEwan | 375/1 |
| 5,517,198 A | 5/1996 | McEwan | 342/89 |
| 5,574,464 A | 11/1996 | Madonna et al. | 342/198 |
| 5,610,611 A | 3/1997 | McEwan | 342/89 |
| 6,325,391 B1 * | 12/2001 | Smith et al. | 277/650 |
| 2006/0071848 A1 * | 4/2006 | Edvardsson | 342/124 |

OTHER PUBLICATIONS

"HMC197"—by Hittite Microwave Corporation, V01. 0700, pp. 13-50-13-55.
"International Search Report" for PCT/SE2005/001302.

* cited by examiner

*Primary Examiner*—Dan Pihulic
(74) *Attorney, Agent, or Firm*—Westman, Champlin & Kelly, P.A.

(57) ABSTRACT

A radar level gauge (RLG), intended for measuring with a close-range low-power radar a distance to a content surface in a container relatively to a measuring position, which is located above the surface and fixed in relation to a lower boundary of said container. The RLG comprises a transmitter for transmitting an electromagnetic transmitter pulse, a signal medium interface connectable to means for directing said transmitter pulse towards said surface and for receiving a reception pulse reflected back from said surface, and a receiver for receiving said reception pulse. A switch connects said signal medium interface to said transmitter while said transmitter pulse is transmitted, and said signal medium interface to said receiver while said reflected pulse is received, the switch having a switching time short enough to enable short distance detection.

According to this design, signal losses can be reduced significantly compared to prior solutions.

30 Claims, 3 Drawing Sheets

RADAR LEVEL GAUGE WITH SWITCH FOR SELECTING TRANSMITTER OR RECEIVER MODE

FIELD OF THE INVENTION

The present invention relates to a radar level gauge intended for measuring with a close-range low-power radar a distance to a surface of a content in a container relatively to a measuring position, which is located above the surface and fixed in relation to a lower boundary of said container.

BACKGROUND

Pulsed RLG (radar level gauging) is becoming a more widely spread method for industrial level gauging, due to its simple and cost effective microwave components. The pulse in a pulsed RLG can be modulated by a carrier frequency (typically 6 or 24 GHz), or be an unmodulated DC pulse. In the latter case, it is common to use some kind of transmission line (coaxial line, twin line, etc.), sometimes referred to as a probe, is usually used to guide the electro-magnetic signal through the material in the tank where it is reflected by one or more interface surfaces (such as air/liquid) between different parts of the tank content. In the former case a transmission line or wave guide can also be used, but generally an antenna is used to form a vertical radar beam which is reflected at possible interface surfaces.

Pulsed radars typically apply different types of directional coupling. An example of a directional coupler including high speed sampling capabilities is described in U.S. Pat. No. 5,517,198. Directional coupling divides the available power between transmission line and receiving line, thus introducing significant attenuation of both transmitted and received signals, degrading the sensitivity of the system. This is in particular a problem for systems using a DC pulse, since the choice of directional coupler is limited by the extreme bandwidth of such a pulse, which includes also large wavelengths.

For this and other reasons, pulsed systems therefore typically have lower sensitivity compared to frequency modulated continuous wave (FMCW) radar. The sensitivity (ability to detect weak reflections) is an important virtue for any RLG as a high sensitivity may enable the use of a smaller antenna or a longer transmission line, all other parameters held constant.

One way to provide a directional coupling without sensitivity losses is to use a circulator, such as a ferrite circulator. However, such solutions are expensive, and their performance is typically temperature dependent, making them unsuitable for use in radar level gauges.

SUMMARY OF THE INVENTION

It is an object of the present invention to cost efficiently improve the sensitivity of pulsed radar level gauge systems.

This and other objects are achieved by a RLG system according to the introduction, comprising a power supply interface for receiving electrical power to said radar level gauge, a communication interface for presenting externally of said radar level gauge information based on said distance, a transmitter for generating and transmitting an electromagnetic transmitter pulse, a signal medium interface connectable to means for directing said transmitter pulse towards said surface and for receiving a reception pulse reflected back from said surface, a fastening structure for securing said signal medium interface in said measuring position, a receiver for receiving said reception pulse, a switch enabling connection of said transmitter and said receiver, respectively, with said signal medium interface, and controller circuitry for controlling the operation of said switch and for determining said distance, said switch being adapted to connect said signal medium interface to said transmitter while said transmitter pulse is transmitted, and to connect said signal medium interface to said receiver while said reflected pulse is received, said switch having a switching time short enough to enable short distance detection.

According to this design, the directional coupler, that previously was arranged between the transmitter and the signal medium interface, has been replaced by a switch. By controlling the switch, the signal medium interface is connected only to the transmitter during the transmission of the pulse, and only to the receiver during reception of the reflected pulse. In this way, signal losses can be reduced significantly compared to prior solutions, where the signal medium interface at all times was connected to both the transmitter and the receiver. Typically, 10 dB improvements have been experienced, which for practical hardware solutions may correspond to 2–3 times longer maximum measuring distance for an antenna system, or maybe 20 meters longer maximum measuring distance for a transmission line system.

By this design, all power of the transmitted pulse will be guided to the tank, at the same time as all power of the reflected pulse will be directed to the receiver. As mentioned, conventional transmission line systems use some kind of power splitter, reducing the amplitude by 50% in each direction, typically resulting in 6+6 dB attenuation compared to the invention.

The switching time of the switch is short enough to enable short distance detection. A radar level gauge typically measures distances in the range from up to several tenths of meters down to fractions of a meter, sometimes only a few centimeters.

A conceptually different solution, implemented with a switch instead of e.g. a directional coupler, is known from more traditional pulse radar, e.g. surveillance radar at sea. Here, the switch is used to switch between transmission of relatively high power signals (kW or MW) and reception of the much weaker radar reflections. These high power signals make it necessary to include even further attenuation between the switch and a receiver circuitry in order not to risk damaging the receiver circuitry. Further, as the switch must be designed to handle the relatively high power levels, it will, as a consequence, be relatively slow. The switching time of such a switch causes a considerable dead zone (in which the distance to be measured is to short to be recorded by the radar), i.e. the distance covered by signal during the time required to switch the switch, typically in the order of ten meters. As such dead zones are completely unacceptable in the field of radar level gauging, such solutions have been considered as unrealistic in this field. According to the invention, however, a system with an acceptable dead zone has been realized.

In order to obtain a sufficiently short dead zone, the switch should have a very short switching time, in the order of ns. Preferably, the switching time is shorter than 20 ns. Such a short switching time can only be realized by a switch without moving parts, comprising very small scale components, either discrete components or in the form of an integrated circuit, and this limited size of the switch makes it unable to handle powers greater than a few Watts. However, in a typical RLG system, the transmitted power is significantly less than one Watt, preferably less than 20 mW, and normally limited to a few mW, or even μW. Thus, the limited power capacity of the switch is not a problem.

In the inventive RLG, it is advantageous to provide for a small signal attenuation between the switch and the receiver, in order to provide higher signal input strength to the receiver for enhancing measuring capability. This RLG should preferably include no significant further attenuation/isolation between the transmitter and receiver than that introduced by the switch itself.

The controller circuitry can be adapted to detect when a pulse is transmitted from the transmitter, and in response to said detection, operate the switch to connect the signal medium interface to the receiver.

Preferably, the controller circuitry is further arranged to operate the switch to again connect the interface to the transmitter after a predetermined period of time. Typically, this period should be shorter than the time between transmission of consecutive pulses from the signal generator.

The controller circuitry is preferably adapted to control the operation of said switch so as to allow determining a value of said distance less than one half of a meter.

In order to ensure that no reflection pulse reaches the switch before it has been switched over to the receiver, the radar level gauge can further comprises a delay feed line between the switch and the signal medium interface. Such a delay feed line can be accomplished e.g. by a coaxial cable of a certain length or conductive patterns on a printed circuit board. The signal time delay between said microwave switch and said signal medium interface preferably allows determining a value of said distance less than one meter, or less than one half a meter. The signal time delay can be equal to or greater than half of a switching time of said switch.

If a satisfactory switching time can be obtained, the switch can be adapted to realize pulse generation, by connecting the signal medium interface to a DC voltage for a period of time equal to the desired pulse width and then disconnecting it. Such operation of the switch will eliminate the need for a separate signal generator, thus simplifying the system.

If the switch has an adequate switching time, it may also be used to realize sampling, or at least pre-sampling, of the reflected signal.

BRIEF DESCRIPTION OF THE DRAWINGS

These and other aspects of the present invention will be described in more detail with reference to the appended drawings, illustrating presently preferred embodiments.

DETAILED DESCRIPTION OF THE PREFERRED EMBODIMENTS

Figure 1:
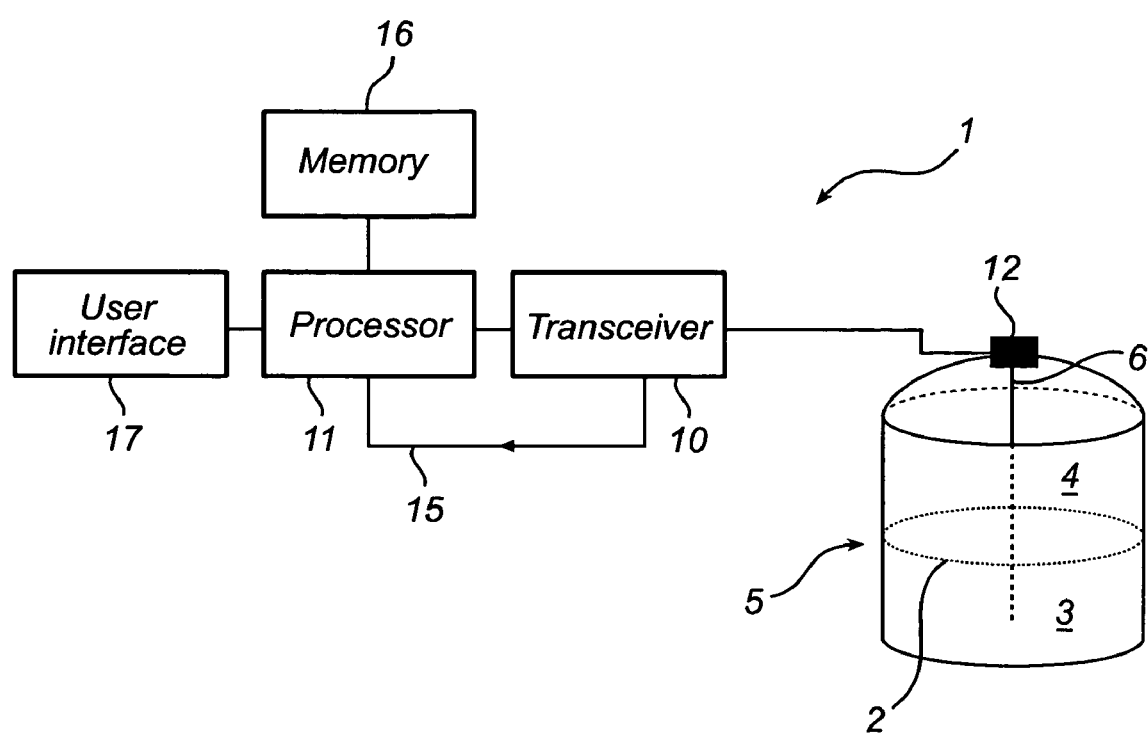
FIG. 1 shows schematically a radar level gauge system.

FIG. 1 shows schematically a radar level gauge (RLG) system 1 in which a method according to the invention may be advantageously used. The system 1 is arranged to perform measurements of a process variable in a tank, such as the level of an interface 2 between two (or more) materials 3, 4 in the tank 5. Typically, the first material 3 is a content stored in the tank, e.g. a liquid such as gasoline, while the second material 4 is air or some other atmosphere. In that case, the RLG will enable detection of the level of the surface of the content in the tank. Note that different tank contents have different impedance, and that the electromagnetic waves will not propagate through any material in the tank. Typically, therefore, only the level of a first liquid surface is measured, or a second liquid surface if the first liquid is sufficiently transparent.

The system 1 comprises a transceiver 10, controlled by a processor 11 to transmit electromagnetic signals to a signal medium interface 12 in the tank 5. The signals can be DC pulses with a length of about 2 ns or less, with a frequency in the order of MHz, at average power levels in the mW or μW area. Alternatively, the pulses can be modulated on a carrier wave of a GHz frequency.

In the case illustrated in FIG. 1, where the signals are DC pulses, and in some case also when modulated pulses are used, the signal medium interface 12 is connected to a wave guiding structure 6 extending into the content of the tank. The wave guiding structure can be a hollow wave guide or some sort of probe, such as a coaxial wire probe, a twin wire probe, or a single wire probe (also referred to as a surface wave guide). Electromagnetic waves transmitted along the structure 6 will be reflected by any interface 2 between materials in the tank, and the reflection will be transmitted back to the signal medium interface 12.

Figure 2:
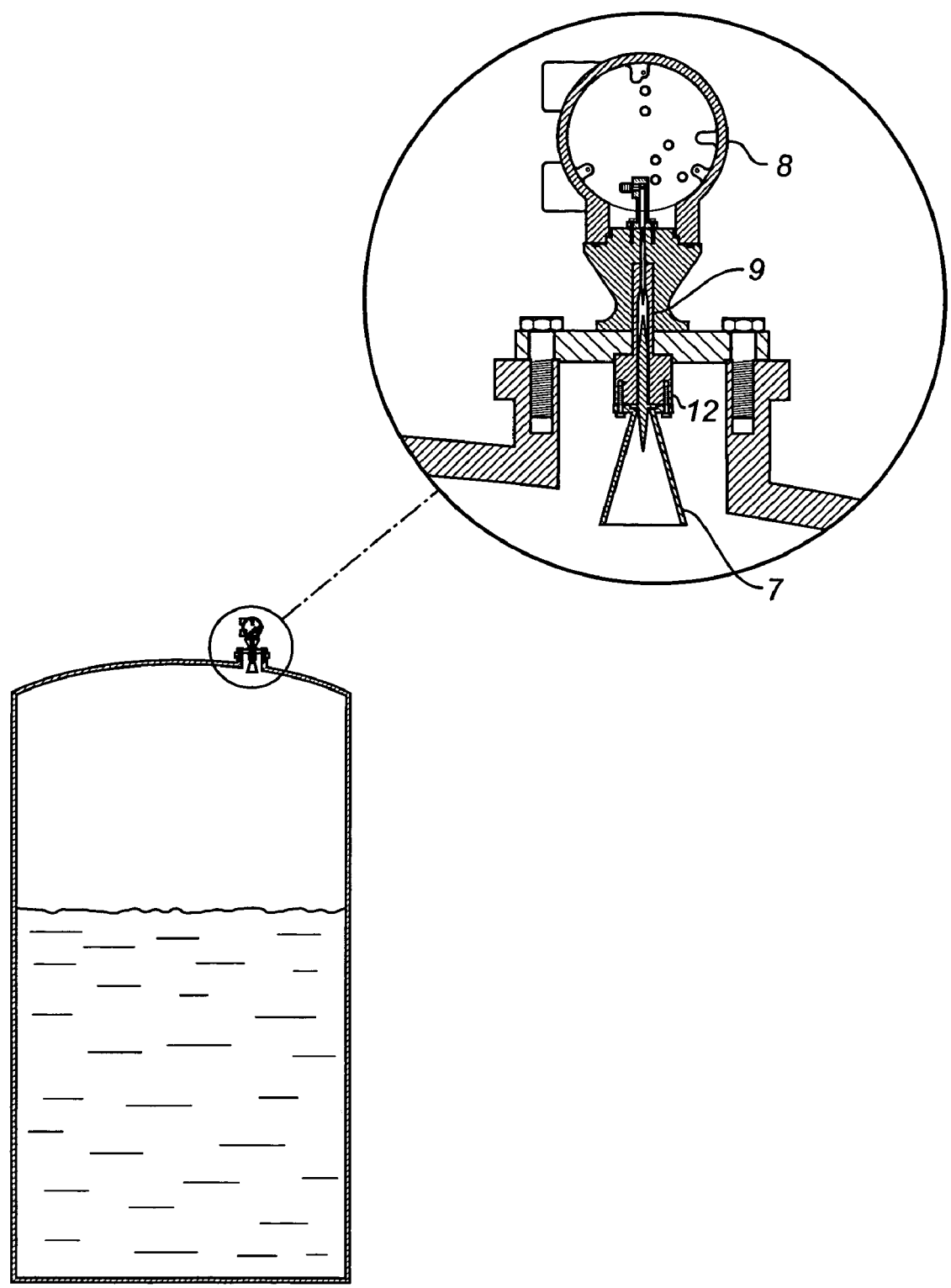
FIG. 2 shows a section view of another radar level gauge system.

Alternatively, as shown in FIG. 2, and as is normally the case where the pulse is modulated on a high frequency carrier wave, the signal medium interface 12 is connected to a radar antenna 7, arranged to emit the transmitted waves to freely propagate into the tank, and to receive waves that are reflected by any interface 2 between materials in the tank.

As shown in FIG. 2, the tank can be provided with a fastening structure 8 securing the signal medium interface 12 in a measuring position fixed relative the bottom of the tank 5. The fastening structure is preferably coupled to a feed through structure 9 in the upper boundary of the tank 5. As shown in FIG. 2, this feed through structure 9 can be wave guide provided with a gas tight sealing 14 capable of withstanding temperature, pressure, and any chemicals contained in the tank.

A reflection pulse received by the signal medium interface is fed back to the transceiver 10, where it is sampled and digitalized in a process controlled by the processor 11. A digitalized, sampled time domain reflectometry (TDR) signal 15 based on the reflected signal is communicated back to the processor 11. The signal 15 can be expanded in time, allowing for use of conventional hardware for conditioning and processing.

The processor 11 is provided with software for analyzing the TDR signal in order to determine a process variable in the tank, typically the level of the surface 2. The processor 11 is further connected to a memory 16, typically comprising a ROM (e.g. an EEPROM) for storing pre-programmed parameters, and a RAM for storing additional software code executable by the microprocessor 11. The processor can also be connected to a user interface 17.

Figure 3:
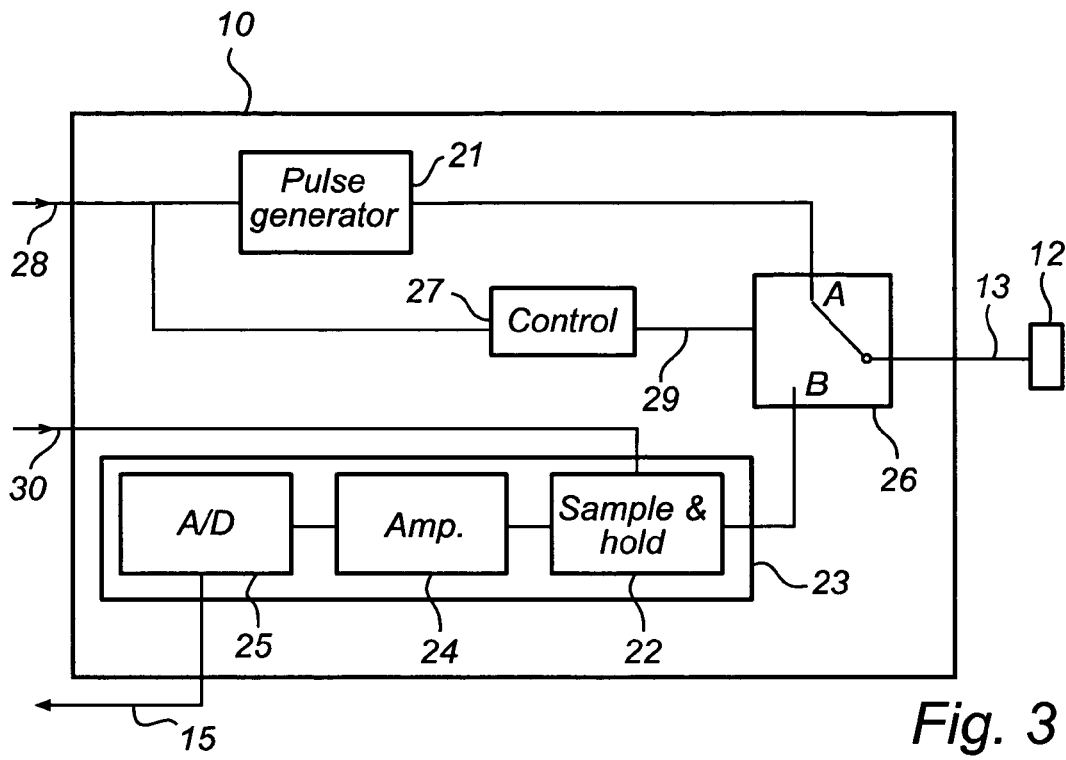
FIG. 3 shows a block diagram of a transceiver according to a first embodiment of the invention.

FIG. 3 shows the transceiver 10 in FIG. 1 in greater detail. The signals are transmitted by a transmitter here in the form of a pulse generator 21, and received by the sample and hold circuit 22 of a receiver 23. The receiver 23 further comprises an amplifier 24 and an A/D-converter 25. A microwave switch 26 is provided to connect the signal medium interface 12 in the tank to either the transmitter 21 (state A) or the receiver 23 (state B).

In the illustrated example, the switch is a microwave monolithic IC (MMIC), here a single pole, double throw (SPDT) switch, having a switching time of around 10 ns. An example of such a switch is the HMC197 from Hittite Microwave Corporation. Other types of switches may be used, both formed as an IC and comprising discrete components.

The switch 26 is controlled by controller circuitry which can be implemented as a separate controller 27, as indicated in FIG. 2, or be implemented directly in the processor 11. The pulse generator 21, sample and hold circuit 22 and controller 27 are all provided with oscillation signals 28, 30 from the processor 11. The output 15 of the A/D-converter is fed back to the processor 11.

The operation of the transceiver 10 will be described in the following.

The transmitter 21 generates pulses with a duration in the order of ns, here 1 ns, with a frequency in the order of MHz, here 2 MHz. For this purpose, the transmitter is provided with a high frequency (e.g. 2 MHz) clock signal 28. Each pulse is transmitted to the signal medium interface 12 via the switch 26, which is in state A. As mentioned, the clock signal 28 is also supplied to the controller 27, which is triggered to provide a switching signal 29 to the switch 26 at the same time as a pulse is generated by the pulse generator. After a time period corresponding to the switching time of the switch 26, typically much longer than the pulse itself, the switch 26 is thus switched to state B, connecting the signal medium interface 12 to the receiver 23.

During the time after the pulse is generated, but before the switch 26 has been switched to state B, the receiver will be unable to receive any signals (resulting in a blind zone or dead zone). In order for reliable operation of the system, it is desirable that no reflected signal reaches the switch 26 during this blind zone, and the switching time is preferably made as short as possible. With components available at the time of the invention, a switching time of 10 ns was considered sufficiently short and reasonably cost efficient.

The transmitter pulse is guided to the signal medium interface 12 in the tank, and is then directed towards the surface 2 by a wave guiding structure (as shown in FIG. 1) or by an antenna (as shown in FIG. 2). The electromagnetic waves are reflected against the surface 2, and a reception pulse is returned to the signal medium interface, and via switch 26 connected to the receiver 23. The sample and hold circuit 22 samples the signal, using an oscillation signal 30 (e.g. in the order of 2 MHz) received from the processor 11. The signal is then amplified by amplifier 24 and digitalized by A/D-converter 25. The result, a time domain reflectometry (TDR) signal 15, is supplied to the processor 11, where it is analyzed by suitable methods to determine a process variable, such as the level of the surface 2 in the tank.

In a case where the switching time of the switch 26 is deemed too long in relation to the expected arrival time of the reception pulse, a delay feed line 13 can be provided between the switch 26 and the signal medium interface 12 in the tank. This delay feed line can be adapted to delay the reception pulse from the tank, thus allowing for a slower switch. The delay feed line 13 can be realized by e.g. a coaxial cable, or a pattern on a printed circuit board. Typically, the extra delay provided by such a delay feed line is in the order of the switching time of the switch 26, and as an example, a 2–3 m long section of coaxial cable would allow for a switching time around 20 ns.

The controller 27 is adapted to return switch 26 to state A (again connecting the signal medium interface 12 to the transmitter 21) after a predetermined period of time, not exceeding the time between consecutive pulses. Here, where the pulse frequency is 2 MHz (time between pulses 500 ns), the controller is thus set to switch the switch back to state A after less than 500 ns. Depending on the application, it may be advantageous to keep the switch in state B for as long as possible, in which case the period is close to the time between pulses (here 500 ns). Alternatively, however, the period is set much shorter, and may for example be only around half of the time between pulses. The controller 27 can employ an internal timer to determine when to switch back to state A, or it can use the clock signal 28.

Figure 4:
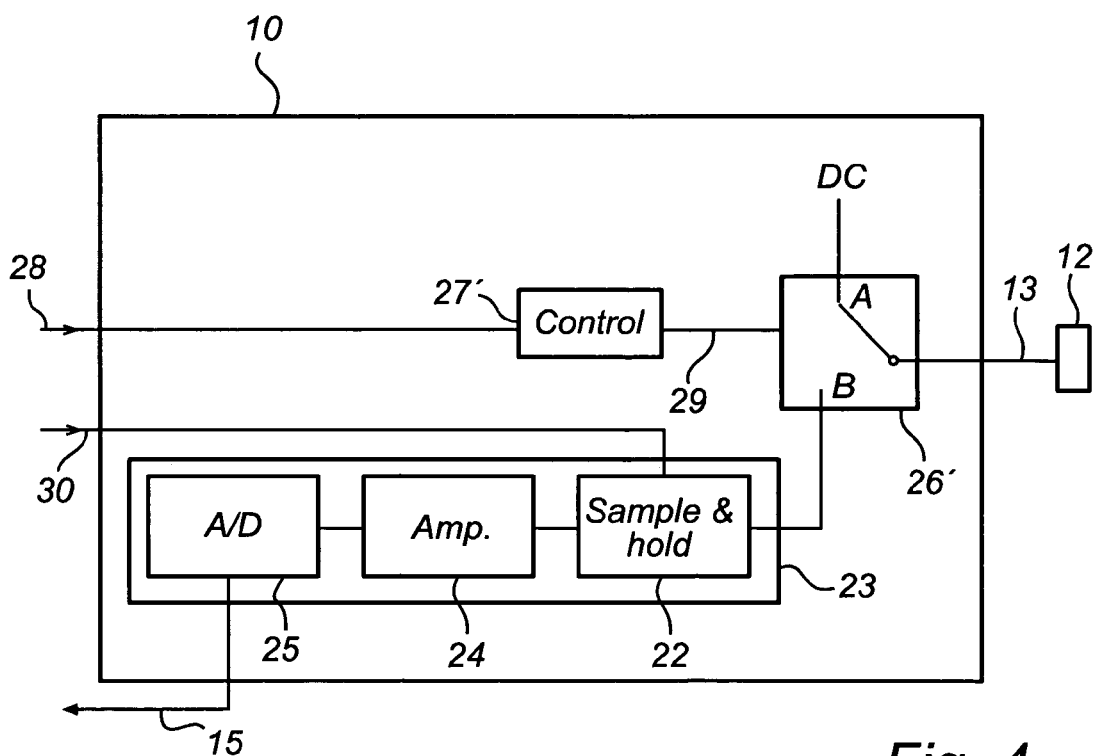
FIG. 4 shows a block diagram of a transceiver according to a second embodiment of the invention.

An alternative embodiment is shown in FIG. 4, where elements identical to the elements in FIG. 3 have been given identical reference numerals. The pulse generator has here been omitted, and the clock signal 28 is connected only to the controller 27', which controls the switch 26' to act as a transmitter. The A terminal of the switch is connected to a DC voltage.

During operation, the switch 26' is kept in state B for most of the time. At the arrival of a clock pulse on line 28, the switch is switched to state A, connecting the DC voltage to the signal medium interface 12. The controller is then adapted to immediately switch the switch back to state B, resulting in a DC pulse transmitted to the signal medium interface 12, this pulse having a pulse width equal to the switching time of the switch.

In order to make this embodiment realistic, the switch should be faster than the 10 ns mentioned above, and should typically be in the order of 1 ns, in order to provide pulses with the desired pulse width.

As an additional aspect of the inventive concept, the switch 26 can be used to perform sampling of the reflected signal. Depending on the switching time of the switch 26, such sampling may be combined with that of the sample and hold circuit 22, or, with a sufficiently fast switch 26, completely eliminate the circuit 22 from the design. Such a sampling function of the switch 26 would also be controlled by the controller 27, which should be adapted to connect the receiver 23 to the signal medium interface 12 intermittently, so that each connection instant corresponds to one sample.

It should be noted that a number of variations of the above described embodiments are possible within the scope of the appended claims. For example, all the components of the radar level gauge system described above are not compulsory, but may be excluded or substituted. Also, additional components may be included if and when deemed advantageous. Other types of switches than the above described may be used to realize the invention, as long as they have a satisfactory switching characteristics.

What is claimed is:

1. A radar level gauge, intended for measuring with a close-range low-power radar a distance to a surface of a content in a container relatively to a measuring position, which is located above the surface and geometrically defined in relation to a lower boundary of said container, said radar level gauge comprising:
   a power supply interface for receiving electrical power to said radar level gauge,
   a communication interface for presenting externally of said radar level gauge information based on said distance,
   a transmitter for generating and transmitting an electromagnetic transmitter pulse,
   a signal medium interface connectable to means for directing said transmitter pulse towards said surface and for receiving a reception pulse reflected back from said surface,
   a fastening structure for securing said signal medium interface in said measuring position,
   a receiver for receiving said reception pulse, a switch enabling connection of said transmitter and said receiver, respectively, with said signal medium interface, and controller circuitry for controlling the operation of said switch and for determining said distance, said switch being adapted to connect said signal medium interface to said transmitter while said transmitter pulse is transmitted, and to connect said signal medium interface to said receiver while said reflected pulse is received, said switch having a switching time short enough to enable short distance detection.

2. The radar level gauge according to claim 1, wherein said switch has a switching time shorter than 100 ns.

3. The radar level gauge according to claim 2, wherein said switch has a switching time shorter than 20 ns.

4. The radar level gauge according to claim 1, wherein the switch is realized as an integrated circuit.

5. The radar level gauge according to claim 1, wherein said switch is a solid state switch.

6. The radar level gauge according to claim 1, wherein the power of the transmitted electromagnetic pulse is less than one Watt.

7. The radar level gauge according to claim 1, wherein the power of the transmitted electromagnetic pulse is less than 100 mW.

8. The radar level gauge according to claim 1, wherein said controller circuitry is adapted to detect when a pulse is transmitted from said transmitter, and in response to said detection, operate said switch to connect said signal medium interface to said receiver.

9. The radar level gauge according to claim 8, wherein said controller circuitry is further arranged to connect the signal medium interface to the transmitter after a predetermined period of time.

10. The radar level gauge according to claim 1, wherein said controller circuitry is adapted to control the operation of said switch so as to allow determining a value of said distance less than one half of a meter.

11. The radar level gauge according to claim 1, wherein said controller circuitry provides simultaneous make and break control signals for the switching of said switch.

12. The radar level gauge according to claim 1, wherein said radar level gauge further comprises a delay feed line between said switch and said signal medium interface.

13. The radar level gauge according to claim 12, wherein said delay feed line provides a signal time delay between said switch and said signal medium interface equal to or greater than half of a switching time of said switch.

14. The radar level gauge according to claim 12, wherein said delay feed line provides a signal time delay between said switch and said signal medium interface so as to allow determining a value of said distance less than one meter.

15. The radar level gauge according to claim 12, wherein said delay feed line provides a signal time delay between said switch and said signal medium interface so as to allow determining a value of said distance less than one half of a meter.

16. The radar level gauge according to claim 12, wherein said delay feed line is provided as conductive patterns of a printed circuit board.

17. The radar level gauge according to claim 1, further comprising a two-wire connection for providing said communication interface and said power supply interface.

18. The radar level gauge according to claim 1, wherein said fastening structure is adapted to couple with a feed-through structure located in an upper boundary of said container.

19. The radar level gauge according to claim 18, wherein said fastening structure is adapted to allow a spatial orientation of said signal medium interface, such that the direction of said transmission pulse is essentially vertical.

20. The radar level gauge according to claim 1, wherein said controller circuitry is adapted to control the operation of microwave switch so as to allow determining a value of said distance less than one meter.

21. The radar level gauge according to claim 1, wherein said pulse is a modulated pulse.

22. The radar level gauge according to claim 1, wherein said signal medium interface is connectable to an antenna, arranged to emit and receive electromagnetic waves in said container.

23. The radar level gauge according to claim 1, wherein said signal medium interface is connectable to a probe, extending into the container content.

24. The radar level gauge according to claim 1, wherein said switch is adapted to realize pulse generation, by connecting said signal medium interface to a DC voltage for a period of time equal to a desired pulse width.

25. The radar level gauge according to claim 1, wherein said switch is arranged to provide sampling of the reflected signal.

26. The radar level gauge according to claim 1, wherein a signal attenuation between the switch and the receiver is constantly less than 10 dB.

27. The radar level gauge according to claim 1, wherein a signal attenuation between the switch and the receiver is constantly less than 3 dB.

28. The radar level gauge according to claim 1, wherein a signal attenuation between the switch and the receiver is constantly less than 1 dB.

29. The radar level gauge according to claim 1, wherein a maximum output signal strength of the transmitter, after attenuation between a transmitter connection and a receiver connection of the switch, is less than or equal to an input signal strength breakdown limit of the receiver.

30. The radar level gauge according to claim 1, wherein a maximum output signal strength of the transmitter is less than or equal to an input signal strength breakdown limit of the receiver.

* * * * *